Oct. 17, 1933.    R. STOVER    1,931,302
METHOD OF DIPPING CENTERS
Original Filed Feb. 23, 1929    2 Sheets-Sheet 1

Inventor:
Russell Stover
By

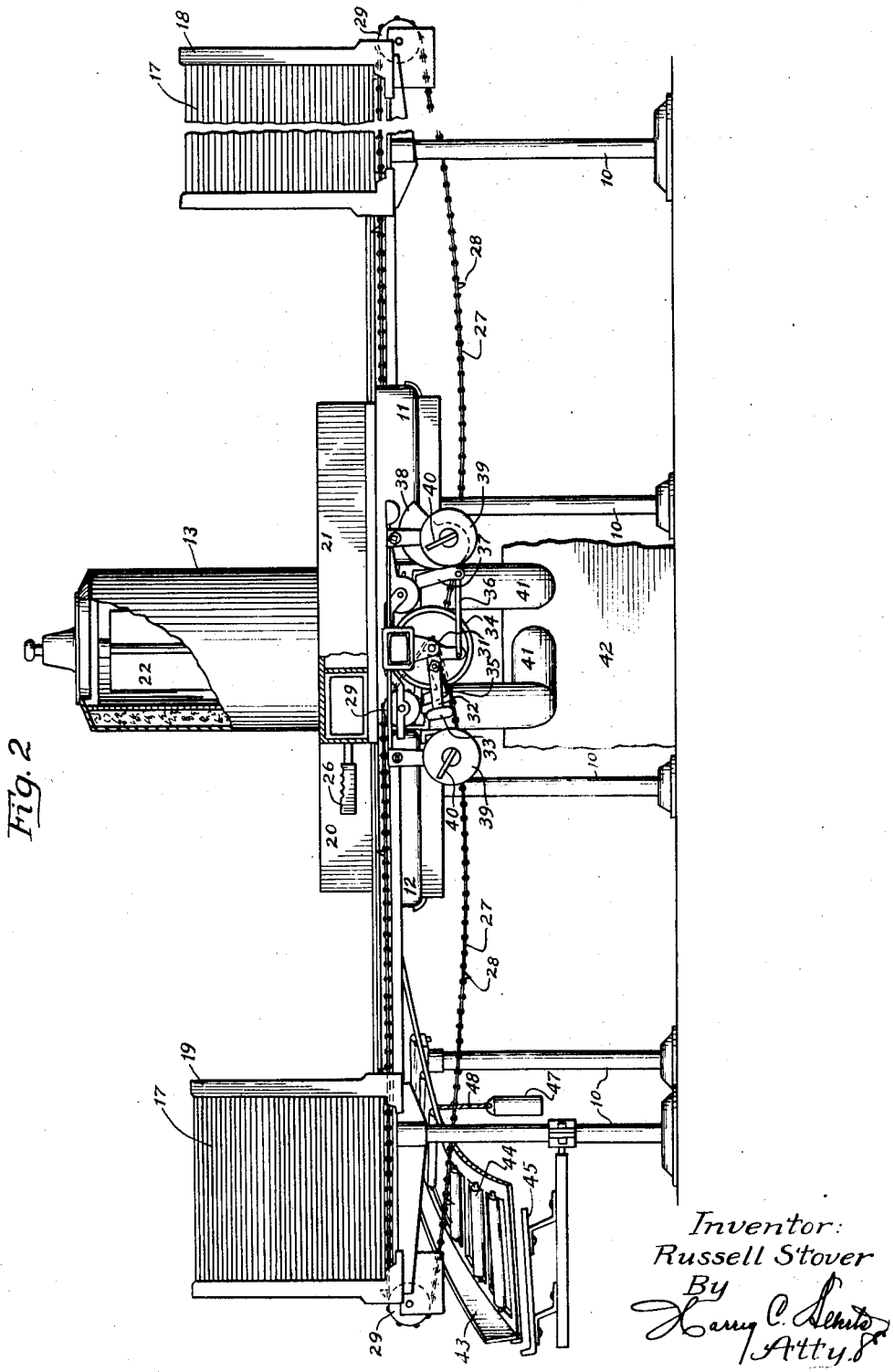

Patented Oct. 17, 1933

1,931,302

UNITED STATES PATENT OFFICE 1,931,302

METHOD OF DIPPING CENTERS

Russell Stover, Kansas City, Mo.

Original application February 23, 1929, Serial No. 342,278. Divided and this application filed December 12, 1931. Serial No. 580,657

12 Claims. (Cl. 91—68)

This invention relates to a method of dipping edible centers and more particularly to improved method which utilizes both manual and mechanical contrivances, although certain features thereof may be employed with equal advantage for other purposes.

It contemplates more especially the provision of a synchronized series of steps for processing edible centers so as to promote increased production, improved results, and rated operation accompanied by limitless flexibility in processing different types of products or centers.

The manual coating of edible centers has been resorted to for many years in preference to machine coating, since the latter is not productive of the desired individuality and variation in coated products which renders them far more appetizing and appealing to the taste. Then, too, machine coating is too inflexible for the processing of various centers. As a result, manual coating still is generally practiced in high quality candy production where short runs of particular edible centers are necessary to procure the desired assortments.

The disadvantage of known manual coating methods resides particularly in the limited and uncontrollable variations in production depending largely upon the individual operators, their temperament and adaptability for such work. This has been overcome with the teachings of the instant invention by providing mechanical contrivances auxiliary to manual operations so that the work of the attendant is substantially reduced and further synchronized therewith so as to set a predetermined pace or rate of dipping as a required production. Thus the advantages of both manual and machine coating are acquired, and the apparatus utilized therefor is disclosed in my copending application serially numbered 342,278 filed February 23, 1929 of which this is a division.

One object of the present invention is to provide a novel process of coating edible centers with improved results and greater production.

Another object is to provide an improved method of processing edible centers by resort to synchronized manual and mechanical steps.

Still another object is the provision of a simple and improved process of continuously coating edible centers in predetermined succession.

A further object is the provision of a novel method of coating edible centers in synchronized timed relation with the conveyance thereof for storage.

A still further object is the provision of an improved continuous process of supplying, coating and conveying edible centers.

Still a further object is the provision of a novel process of producing improved coated centers at an increased rate of production.

Other objects and advantages will appear from the following description of an illustrated embodiment of the present invention.

In the drawings:

Fig. 2 is a front elevational view of the mechanism disclosed in Fig. 1.

Figure 1:
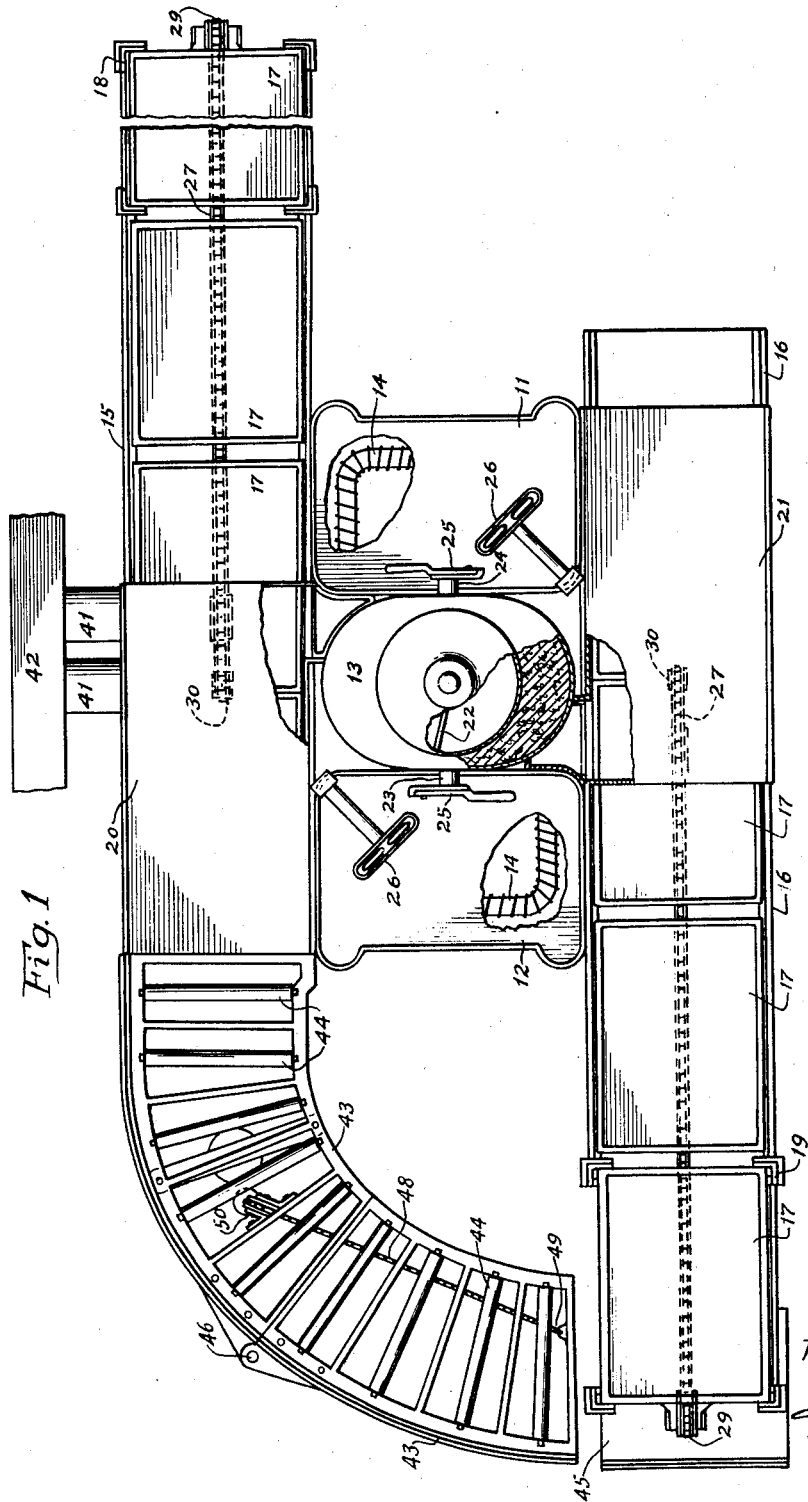
Fig. 1 is a plan view of the mechanism utilized in practicing the process embodying features of the present invention.

The structure selected for illustration demonstrates one mode of practicing the process embodying features of the present invention. As shown, the mechanism is supported in any suitable manner with appropriate standards or legs 10 which centrally sustain dipping pans 11 and 12, in this instance two, in spaced opposed relation with an insulated kettle or reservoir 13 which is electrically heated to maintain coating material in a fluid state. The heat supplied thereto is preferably thermostatically controlled by mechanism of standard or known design which is omitted to clarify the disclosure. The dipping pans 12 and 13 are arranged on opposite sides of the electrically heated reservoir or kettle 13, and these are also provided with heating elements 14 to maintain the coating supplied thereto in a liquid state conducive to effective dipping.

In order to convey the dipped or coated centers, spaced rails or slides 15 and 16 are provided on both sides of the dipping pans 11 and 12 for proper extension and termination depending upon the particular requirements of any installation. These rails 15 and 16 support trays 17 which are successively placed thereon by means of tray racks or magazines 18 and 19 disposed at the initial position adjacent and in communication with the extremities of the rails 15 and 16. So that the coated centers may be artificially cooled during movement, refrigerated cooling tunnels 20 and 21 are provided in enveloping relation with the tracks or rails 15 and 16 which guide the trays 17 therethrough. It is apparent, therefore, that the operator using pan 11 places the dipped goods upon the trays 17 which slide upon the rails 15 and pass through the cooler 20, while the dipper facing the pan 12 places dipped goods upon the trays 17 which ride on the rails 16 for passage through the cooler 21.

Now, then, chocolate or other suitable coating material is placed in the kettle or reservoir 13 which, as described, is heated at a uniform temperature to maintain the substance at the proper temperature, viscosity and consistency. Within the reservoir 13 is an agitator 22 rotated by mechanism to be hereinafter described, so that the coating material is maintained at the desired temperature uniformly throughout. Spouts 23 and 24 controlled by valves 25 are connected to the bottom of the reservoir 13 on opposite sides thereof so that the coating substance may be withdrawn or discharged into the pans 11 and 12.

The operators are preferably seated to face the dipping pans 11 and 12, and candy centers or other edible centers are supplied to the dippers in any convenient manner by another attendant standing in front of the cooler 21 or from suitable hoppers constituting a constant source of supply as commercial practice may dictate. The dippers then immerse the centers in the coating substance confined in the pans 11 and 12, and deposit or place the dipped goods upon the trays 17 which move along the tracks 15 and 16 from magazines 19 and 20, respectively. Adjacent the reservoir 13 and above the pans 11 and 12 are combination hand wipers and melting troughs 26. The front edges of the wipers 26 are shaped to conform with the contour of the fingers of the dipper so that the excess coating substance may be scraped from the hands and fingers at intervals during the dipping operation when necessary or conducive to better results. The wipers are preferably heated by electrical heating elements (not shown) to facilitate removing of the excess coating substance which clings to the fingers of the dipper and affects the facility with which the human fingers may be properly utilized.

The mechanical operators comprise conveyor chains 27 which pass beneath the magazines 19 and 20 so that the upstanding lugs 28 thereon will engage the trays 17 confined therein, the lugs 28 contacting against the rear of the tray 17 which effects the removal thereof from the stack for displacement along the rails 15 and 16 to a position accessible to the operator. The standards of the magazines 19 and 20 which hold the front of the trays 17 have slotted openings enabling the removal of only the lowermost tray 17 of the stacks which are fed down by gravity. The rate of travel of the trays 17 will be explained in connection with the description of the driving mechanism; however these are intermittently or, if desired, slowly moved along the path of travel so that the operators may fill the trays with uniform rows of freshly dipped centers. The speed of tray travel is measured by the capacity of the dipper who is required to fill the trays with the dipped centers. The conveyor chains 27 ride over sprocket wheels 29 rotatively mounted on the frame 10 of the machine. The chains 27 are driven from small sprocket wheels 30 mounted upon the shafts 31, and it is worthy of note that the driving mechanism for both conveyor chains is identical so that a separate description thereof is thought unnecessary.

The driving mechanism, briefly described, preferably comprises a motor suspended beneath the frame for operative connection to a train of gears and an agitator 32 journalled about its axis within the kettle or reservoir 13 to impart thorough mixing and turbulence to the coating substance confined therein. The power source oscillates, through suitable instrumentalities, crank arms 33 which have weights 34 at their outer free ends to effect the return thereof to initial position after they have been oscillated. The crank arms 33 are pivoted and freely rotatable upon the shafts 31 which carry the sprocket wheels 30, there being drive wheels 34 fixedly mounted thereon to cooperate with friction shoes or drags 35. The free outer ends of these friction shoes 35 are adapted to contact the circumference or peripheries of the drive wheels 34. Consequently, the frictional contact thereof with the drive wheels 34 is effected when the connecting links 36 effects oscillatory movement about pivots 31 in response to the movement of the cam operated arms 37.

In other words, the lever arms 37 are cam operated from the power source to motivate links 36 which oscillate the crank arms 33 through a sector of a circle about pivots 31. With the advancing period of oscillation of the crank arms 33, the weighted free ends 34 of the crank arms 33 are elevated to correspondingly raise the shoes or drags 35 from friction engagement or contact with the rim of the drive wheels 34. Upon the return of the crank arms 33 in an opposite direction, the friction shoes 35 frictionally engage the peripheries of the drive wheels 34, thereby imparting rotation thereto in unison with the sleeve integral therewith on the shaft 31. This rotative movement of the drive wheels 34 is transmitted to the conveyor chains 27 through the sprockets in mesh therewith, and the trays 17 are thus intermittently moved along the rails 15 and 16 for correspondingly short distances. To regulate the rate of travel of the trays 17, cam shaped disks 38 are positioned in the path of the crank arms 29 so as to limit and control the oscillatory movement thereof. Calibrated dials 39 are conveniently positioned on the machine within ready access of the attendant, there being adjustable indicating hands or levers 40 operatively associated therewith to vary the rapidity of travel or advancement of the trays 17. This affords accurate regulation within a substantial range or variations in speed. In consequence thereof, the speed may be regulated from practically no perceptible movement to a maximum rate controlled by the limit of the dipper's capability of filling trays with the coated centers.

As described supra, the rails 15 and 16 extend through coolers 21 which are positioned in parallelism to receive the reservoir 13 therebetween on both sides thereof. These cooling tunnels are supplied with cool air through ducts or pipes 41 in communication with a larger air duct 42. With this arrangement, the coated centers slowly move along a predetermined path within the production capacity of the particular attendant, and simultaneously the trays 17 filled with coated centers are subject to sufficient refrigeration to harden the coating during the travel thereof in the cooling chambers 20 and 21. The calibrated control 39—40 serve to indicate the efficiency of the attendant and the supervisor may thus set the pace of the operator or dipper so as to produce the largest possible volume. The trays 17 on the rails 15 and 16 are independently regulated so that the movement thereof will conform with the capacity of the particular dipper who deposits the coated centers thereon.

It is apparent that the trays 17 are fed from the magazines 19 and 20 for movement along the rails 15 and 16, respectively, which are used by operators facing the dipping pans 11 and 12, respectively. Thereupon the operators continue with the deposit of the dipped goods thereon for placement in uniform rows, and these pass through the coolers 21 for removal from opposite ends. Thence, the filled trays 17 are placed in suitable storage racks or instrumentalities may be provided for their automatic displacement thereto. So that a single attendant may remove the trays 17 from both rails 15 and 16, the former is provided with a semicircular inclined chute 43 upon which are mounted idler rollers 44 for termination in a small delivery platform 45 proximate to the rail 16 and in substantial alignment therewith so that the trays thereon may be accessible therefrom. It is to be noted that the chute 44 is pivoted as at 46 to permit the dipper using the pan 12 to reach her position adjacent the dipping trough. The pivoted portion of the chute 43 is held in position by a weight 47 attached to a cord 48 which is anchored at one end 49 thereof. This cord 48 passes over a pulley 50 which is mounted upon a transverse brace constituting a portion of the chute 43. The purpose of the inclined chute 43 is to render the trays 17 available at the front of the machine so that one attendant for both dippers can supply edible centers and remove the full trays 17 from the delivery platform 45 and rail 16 for transport to storage racks without the necessity of passing around the machine. In this way production is considerably increased and the trays 17 collected from the front or one side of the mechanism.

The advantages of the method herein described are readily obvious, since the cumbersome methods heretofore practiced are entirely eliminated by resort to methodical, synchronized and combined manual and mechanical steps which are advantageously coordinated to produce unprecedented results both in the taste appeal of the resulting product and increased production. The coating substance is also maintained at a constant temperature during the dipping operation, and trays are automatically furnished to receive the dipped goods which move at a constant and uniform rate. The dipping is reduced to substantially a single operation and accomplished with greater rapidity and with more uniform results. The chilling of the coated product immediately after the dipping operation improves the character of the goods to assume a satin-like finish or sheen which is not obtainable with the teachings of the old methods involving either manual or mechanical steps in the absence of immediate chilling. The drive control permits the mechanism to be individually regulated for adaptation to the capacity of the individual operators according to their speed and dipping facility. By resort of the teachings of the instant invention, operations have been speeded up more than three fold as compared with known methods heretofore utilized for substantially a similar purpose.

Various changes may be made in the embodiment of the invention herein specifically described without departing from or sacrificing any of the advantages of the invention as defined in the appended claims.

I claim:

1. A method of manufacture which consists in displacing trays from a source of supply along a predetermined path, supplying edible centers to a dipping pan for application of a coating thereto, placing said coated centers on said trays, filling the said trays with coated centers prior to tray movement beyond placement range, and synchronizing the displacement of said trays within the capacity of depositing centers thereon.

2. A method of candy manufacture which consists in displacing cooling trays along a predetermined path, successively moving said cooling trays past and adjacent dipping pans to permit the deposition of dipped goods thereon and depositing dipped centers on said trays substantially in timed relation with the movement thereof.

3. A method of manufacture which consists in conveying cooling trays in predetermined timed movement along a predetermined path, successively moving said trays past and adjacent dipping pans on both sides thereof to permit the deposition of dipped goods therefrom to said trays, and controlling the succession of said cooling trays in their movement past said dipping pans within the capacity of coated center deposition thereon.

4. A method of candy manufacture which consists in vertically stacking trays in alignment, conveying the trays along predetermined substantially horizontal paths in timed sequence adjacent dipping pans to permit the deposition of dipped goods thereon, successively depositing dipped centers on said trays until substantially filled, and continuing the movement of said filled trays for timed cooling of the dipped goods and consequent storage on said trays.

5. A method of candy manufacture which consists in vertically stacking trays in alignment, conveying the trays along predetermined substantially horizontal paths in timed sequence adjacent dipping pans to permit the deposition of dipped goods thereon, successively depositing dipped centers on said trays until substantially filled, and continuing the movement of said filled trays for timed cooling of the dipped goods, and removing said filled trays at their end of travel for storage with the dipped goods thereon.

6. A method of manufacture which consists in aligning cooling trays for movement adjacent dipping pans, controlling the movement of said trays to intermittently stop adjacent said pans for deposit of dipped goods thereon, trays on both sides thereof, varying the intermittent inactivity of said cooling trays adjacent said dipping pans to enable the capacity placement of coated centers thereon, and subjecting the cooling trays to refrigeration while moving enroute to storage.

7. A method of manufacture which consists in providing a continuous supply of coating material adjacent dipping pans, withdrawing a quantity of coating material for flow in said pans, supplying edible centers for successive submergence in said pans to effect the coating thereof, displacing cooling trays in succession adjacent said dipping pans to permit the deposition of goods on said cooling trays subsequent to the coating operation, successively depositing dipped goods on said cooling trays, controlling said cooling tray movement within the capacity placement of said dipped goods thereon, and further displacing said trays for storage.

8. A method of manufacturing coated edibles which consists in dipping centers in a suitable coating fluid, individually removing the dipped centers from the coating fluid, draining the superfluous coating from said centers, placing said centers on cooling trays which successively move adjacent the coating fluid, and filling the cooling trays with the coated centers prior to tray removal from placement range.

9. A method of manufacturing coated edibles which consists in dipping centers in a suitable coating fluid, individually removing the dipped centers from the coating fluid, draining the superfluous coating from said centers, placing said centers on cooling trays which successively move adjacent the coating fluid, filling the cooling trays with the coated centers prior to tray removal from placement range, and removing the filled cooling trays from their predetermined path of travel for storage.

10. A method of manufacture which consists in supplying edible centers to confronting dipping pans containing coating fluids, individually removing the dipped centers from the coating fluid, draining the superfluous coating from said centers, placing said centers on cooling trays which intermittently move successively in lanes adjacent both aligned sides of said confronting dipping pans, placing said centers from each dipping pan on different successive lanes of cooling trays, and filling the cooling trays with the coated centers prior to tray movement beyond placement range.

11. A method of manufacture which consists in supplying edible centers to confronting dipping pans containing coating fluids, individually removing the dipped centers from the coating fluid, draining the superfluous coating from said centers, placing said centers on cooling trays which intermittently move successively in lanes adjacent both aligned sides of said confronting dipping pans, placing said centers from each dipping pan on different successive lanes of cooling trays, filling the cooling trays with the coated centers prior to tray movement beyond placement range, and synchronizing the intermittent movement of the cooling trays with the placement capacity of coated centers thereon.

12. A method of manufacture which consists in supplying edible centers to confronting dipping pans containing coating fluids, individually removing the dipped centers from the coating fluid, draining the superfluous coating from said centers, placing said centers on cooling trays which intermittently move successively in lanes adjacent both aligned sides of said confronting dipping pans, placing said centers from each dipping pan on different successive lanes of cooling trays, filling the cooling trays with the coated centers prior to tray movement beyond placement range, and discharging both lanes of cooling trays to a predetermined position for placement in storage.

RUSSELL STOVER.